United States Patent [19]

Ghidoni et al.

[11] Patent Number: 5,304,597
[45] Date of Patent: Apr. 19, 1994

[54] THERMOPLASTIC COMPOSITIONS BASED ON A VINYL AROMATIC GRAFT COPOLYMER AND A POLYAMIDE

[75] Inventors: Dario Ghidoni; Gian C. Fasulo; Anna G. Rossi; Luigi Bonetti, all of Mantova; Italo Borghi, Ferrara, all of Italy

[73] Assignee: ECP Enichem Polimeri S.R.L., Milan, Italy

[21] Appl. No.: 87,469

[22] Filed: Jul. 8, 1993

Related U.S. Application Data

[63] Continuation of Ser. No. 727,900, Jul. 10, 1991, abandoned.

[30] Foreign Application Priority Data

Jul. 12, 1990 [IT] Italy ................. 20921 A/90

[51] Int. Cl.⁵ .............................. C08L 77/00
[52] U.S. Cl. ...................... 525/66; 525/179
[58] Field of Search .......................... 525/66

[56] References Cited

U.S. PATENT DOCUMENTS 4,584,344 4/1986 Baer ...................... 525/66

FOREIGN PATENT DOCUMENTS 0266221 5/1988 European Pat. Off. .
0355792 2/1990 European Pat. Off. .

Primary Examiner—Ana L. Carrillo
Attorney, Agent, or Firm—Oblon, Spivak, McClelland, Maier & Neustadt

[57] ABSTRACT

Thermoplastic compositions having improved mechanical characteristics and particularly an improved impact resistance, especially when measured on test pieces having high thickness, comprising:
(A) an impact resistant vinyl aromatic graft copolymer containing an amount comprised between 0.1 and 2% by weight of an ethylenically unsaturated compound having a carboxylic group or one of its derivatives in the molecule; and
(B) a polyamide resin.

11 Claims, No Drawings

THERMOPLASTIC COMPOSITIONS BASED ON A VINYL AROMATIC GRAFT COPOLYMER AND A POLYAMIDE

This application is a continuation of application Ser. No. 07/727,900, filed on Jul. 10, 1991, now abandoned.

FIELD OF THE INVENTION

The present invention relates to thermoplastic compositions based on a vinyl aromatic graft copolymer and a polyamide.

More particularly, the present invention relates to thermoplastic compositions based on an impact resistant styrenic graft copolymer and a polyamide, having improved mechanical properties, particularly an improved impact resistance especially when measured on test pieces having high thickness; these compositions are particularly suitable for injection molding and thermoforming.

BACKGROUND OF THE INVENTION

As known, impact resistant vinyl aromatic copolymers are obtained by bulk or bulk-suspension polymeryzation of olefinic rubber solutions, such as ethylenepropylene (EPM) or ethylene-propylene-non conjugated diene (EPDM) solutions, in a vinyl aromatic monomer alone or in blend with other polymerizable ethylenically unsaturated monomers.

Styrene-acrylonitrile copolymers grafted on olefinic rubbers (AES) show a very good impact resistance but their low thermoresistance makes them unsuitable for particular applications where temperatures of 120°-160° C. are used, or for manufacturing products which come into contact with parts heated at such temperatures.

It is known that a way of improving those missing property of AES copolymers is to provide a blend with other polymers having a good thermoresistance such as for example a polyamide. In fact, such resin shows a good elongation, high energy absorption, especially in ball drop tests, and a very good thermoresistance; however, the high notch sensitivity and water absorbtion constitute a significant limitation for the use of these resins. Moreover, polyamides are seldom compatible with the impact resistant vinyl aromatic copolymers, therefore, the interfaces between the domains of the blend components represent very weak areas along which the breaking of the material takes place.

In order to make polyamides compatible with impact resistant vinyl aromatic copolymers, it was proposed in the published German patent Application N. 3, 120, 803 to use a compatibilizer constituted by a styrene copolymer containing from 2 to 50% by weight of carboxylic acid and/or reactive anhydride groups. The compatibilizing copolymer described in that reference has a molecular weight between 500 and 20.000; in particular 500 and 7.000, preferably between 800 and 2.000.

The so obtained mixtures have improved impact strength (IZOD) properties which, however, are not completely satisfactory for several applications.

According to the published European patent Application No. 202214, the impact strength of the polyamide compositions can be improved by preparing a blend comprising:

a) 5–79.5% by weight of a composition grafted on rubber consisting of graft copolymer of 15–85% by weight of at least one monomer selected from the group consisting of $C_1$–$C_4$ alkyl methacrylate, $C_1$–$C_4$ alkyl acrylate, metha-acrylonitrile and acrylonitrile and of 85–15% by weight of a vinyl aromatic monomer, wherein the monomers are polymerized in the presence of and grafted on a rubber substrate having a glass transition temperature below 0° C., wherein the percentage by weight of rubber is from 5 to 80% and the percentage by weight of graft copolymer is from 95 to 20%;

b) 94.5–20% by weight of a polyamide, and c) 0.5–60% by weight of a compatibilizing copolymer comprising a copolymerized, functionalized monomer able to react with the polyamide, wherein the functionalized monomer concentration is comprised between 0.05 and 4% mol., with respect to the copolymer.

However, the so obtained compositions, do not have an optimal combination of properties for all of the applications in they can be used.

In particular, an increase in impact strength can be obtained by using an excess of impact resistant vinyl aromatic polymer with respect to the polyamide resin; however, this increase is at the cost of the thermoresistance. Therefore the obtained products can't be processed at a temperature over 120°–140° C. On the contrary, by increasing the polyamide resin content, the thermoresistance of the composition increases, however, it is achieved at the cost of the impact strength.

SUMMARY OF THE INVENTION

It has now been found by the Applicant that the use of a high impact vinyl aromatic graft copolymer containing in the chain units deriving from an ethylenically unsaturated comonomer having a carboxylic group or one of its derivatives, not only allows avoiding the use of a compatibilizing agent, as being itself compatible with the polyamide resin, but yields also an optimal combination of properties to the compositions, making them useful in all fields where both high impact strength and high thermo-resistance are required.

DETAILED DESCRIPTION OF THE INVENTION

The subject matter of the present invention is, therefore a thermoplastic composition having an optimal balance of mechanical, thermal and rheological properties, particularly high impact resistance (IZOD) characteristics, especially on test pieces having high thickness, comprising:

A) from 10 to 90% by weight of a high impact vinyl aromatic graft copolymer consisting of a vinyl aromatic monomer and an ethylenically unsaturated acrylic monomer copolymer and of an olefinic elastomer; this vinyl aromatic monomer-ethylenically unsaturated acrylic monomer copolymer being at least partially grafted on the olefinic elastomer, and containing in turn grafted an amount comprised between 0.1 and 2% by weight of an ethylenically unsaturated monomer having a carboxylic group or one of its derivatives, such as anhydride, amide or ester in the molecule;

B) from 90 to 10% by weight of a polyamide resin.

The ratio by weight of the high impact vinyl aromatic graft copolymer and the polyamide resin (A/B) is preferably between 70:30 and 30:70.

The component A of the thermoplastic composition of the present invention is a high impact vinyl aromatic graft copolymer preferably comprising:

100 parts by weight of a high impact vinyl-aromatic copolymer consisting of from 90 to 30% by weight of a vinyl-aromatic monomer/ethylenically unsaturated acrylic monomer copolymer at least partially grafted on 10–70% by weight of an olefinic elastomer, and from 0.1 to 2% parts by weight of an ethylenically unsaturated monomer containing in the molecule a carboxylic group, or one of its derivatives such as anhydride, amide or ester, said monomer being grafted on said high impact vinyl-aromatic copolymer.

In the vinyl-aromatic monomer/ethylenically unsaturated acrylic monomer copolymer, the ratio by weight between the two components is between 90:10 and 50:50, preferably between 80:20 and 60:40.

The amount of the ethylenically unsaturated monomer containing in the molecule a carboxylic group or one of its derivatives is preferably comprised between 0.3 and 1% by weight, with respect to the high impact vinyl-aromatic copolymer.

The high impact vinyl-aromatic graft copolymers used in the compositions of the present invention can be prepared either by means of a direct polymerization of the constituting monomers or by grafting the ethylenically unsaturated monomer, containing a carboxylic group or one of its derivatives, on the previously prepared high impact copolymer consisting of a vinyl aromatic monomer/ethylenically unsaturated monomer/olefinic elastomer, in an extruder in the presence of a peroxide catalyst, at a temperature which corresponds at least to the melting point of the components.

The polymerization is preferably carried out in continuous way using a solution consisting of a mixture of monomers including a vinyl-aromatic compound, an ethylenically unsaturated acrylic monomer and an ethylenically unsaturated monomer containing in the molecule a carboxylic group, or one of its derivatives, in the presence of an olefinic elastomer, a polymerization initiator and an inert solvent.

The polymerization is preferably carried out in one or more reaction steps, arranged in series, and in each step the reaction mass is gently and homogeneously stirred to guarantee a perfect thermal exchange.

The olefinic elastomer and the initiator are homogeneously dissolved in the monomers and in the solvent, then the solution is fed to the first reaction step; the polymerization is then continued in the subsequent steps at a temperature comprised between 70° and 150° C. and at a pressure which is higher than the evaporation pressure of the fed monomers and solvent.

When the polymerization process is finished, the reaction mass is made to flow through a thin-film evaporator heated at a temperature comprised between 150° and 300° C. and equipped with rotating blades which give the polymer a sufficient shearing stress resistance to obtain the required morphological structure. The unreacted monomers and solvent, recycled from the evaporator, are fed to the first step.

This procedure enables the monomers to be polymerized with gentle stirring, allowing, at the same time, an excellent thermal control of the reaction without taking into consideration the size and structure of the particles which will be carried out in the finishing step, in the thin-film evaporator in which the unreacted monomers and solvent are eliminated and, at the same time, the particle size is reduced to values below 1, preferably between 0.1–0.4 micrometer, by means of a dynamic action which causes a variation in the structure of the elastomeric phase.

The solvent used is preferably an aromatic hydrocarbon such as benzene, toluene, ethyl-benzene, xylene, isopropyl-benzene, and so on. The amount of the solvent used is between 50 and 300, and preferably from 60 to 150, parts by weight every 100 parts by weight of the monomers and elastomer.

The polymerization reaction, as generally all the solution graft-polymerization reaction, is carried out in the presence of a free-radical polymerization initiator. Any known free-radical initiator can be used, even if the known organic peroxides normally used in the graft-polymerization are preferred. Suitable organic peroxides are the following: aromatic diacyl peroxides such as dibenzoyl peroxide: peroxy-esters such as tert-butyl peroxy-isobutyrate, tert-butyl peroxy-laurate, tert-butyl peroxy-benzoate, etc.; perketals such as 1,1-di-tert.butyl-peroxy-3,3,5-trimethyl-cyclo-1,1-di-tert.butyl-peroxi-3,3,5-trimethyl-cyclohexane, 2,2-di-tert.butyl-peroxy 2,2-di-tert.butyl-peroxi butane, etc.; peroxicarbonates such as tert.butyl-peroxy-isopropyl-carbatert-.butyl-peroxi-isopropyl-carbonate; and peroxi-ketones such as 1,1-bis-tert.-butyl-peroxy 1,1-bis-tert.-butyl-peroxi-3,3,5-trimetyl cyclohexanone, etc. It is also possible to use mixtures of two or more of the above peroxides. The amount of peroxide is such as to allow a polymerization conversion in the first polymerization reactor of between 40 and 80% by weight; normally the amount used is between 0.1 and 2.0% by weight with respect to the total quantity of the monomers and elastomer.

The above-mentioned polymerization process allows to carry out a high degree of grafting on the elastomeric chain of the resin consisting of the vinyl aromatic monomers and the ethylenically unsaturated acrylic monomer and the ethylenically unsaturated monomer containing a carboxylic group or one of its derivatives. This grafting takes place mainly during the first polymerization step which occurs isothermally, preferably at a temperature which corresponds to the halving time of about 1 hour of the peroxide initiator used. In practice, the temperatures used are between 100° and 250° C.

The thin-film evaporator used in the above reported process for the finishing operation and for obtaining the desired particle size, can be of any known type. In particular, the thin-film evaporator described in the published European patent application No. 267025 is preferred.

The above-mentioned continuous and solution polymerization process is already known and described in the published European patent application No. 286071, whose content is considered an integral part of the present patent application.

The high-impact vinyl-aromatic graft copolymers used in the compositions of the present invention can also be prepared by extrusion or by means of other equipment suitable for heat mixing, by direct reaction of the previously prepared high impact copolymer-consisting of vinyl-aromatic monomer, ethylenically unsaturated acrylic monomer and olefinic elastomer with the ethylenically unsaturated monomer containing a carboxylic group or one of its derivatives, in the presence of a peroxide initiator having a half life of between 2 and 20 seconds, at 200° C.

It is preferred to carry out the reaction at temperatures higher than 150° C. and, more preferably, between 170° and 250° C. for a dwell time more than 15 seconds.

Examples of suitable peroxide initiators are the following: tert.butyl-cumyl peroxide, bis(tert.butyl-peroxy-isopropyl) benzene, di-tert.butyl peroxide, 2,5-dimethyl-2,5-di-tert.butyl peroxy-hexane, dicumyl peroxide etc. All the above peroxides are known on the market under the registered trade marks of Trigonox ® and Perkadox ® of the company AKZO Chemie bv.

Concentrations of the peroxide initiator comprised between 0.01 and 1 and preferably between 0.1 and 0.5 parts by weight for 100 parts by weight of the high-impact copolymer, are normally used.

The vinyl-aromatic monomer, used in the production of the high-impact graft copolymer, corresponds to the general formula:

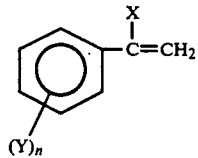

wherein:

X is a hydrogen or one alkyl radical having 1 to 4 carbon atoms;

Y represents hydrogen, a halogen or an alkyl radical having 1 to 4 carbon atoms; and n is equal to zero or an integer comprised between 1 and 5.

Examples of vinyl-aromatic monomers having the above mentioned general formula are: styrene; methyl-styrene; mono-, di-, tri-, tetra- and penta-chloro-styrene and the corresponding alpha-methyl-styrenes; styrenes alkylated in the nucleus and the corresponding alpha-methyl-styrenes such as ortho- and para-methyl-styrenes; ortho- and para-methyl-alpha-methyl-styrenes, 3,5-di-methyl-styrene and tert.butyl-styrene, etc.

These monomers can be used alone or mixed together.

The ethylenically unsaturated acrylic monomer has the general formula:

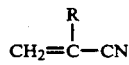

where R is a hydrogen or an alkyl group containing 1 to 5 carbon atoms. Acrylonitrile is the preferred monomer.

Olefinic elastomers suitable for being used in the copolymers of the present invention include those both at high and low unsaturation degree. Among the elastomers at low unsaturation we mainly mention the EPM and EPDM rubber in which the ethylene/propylene weight ratio is preferably comprised between 90:10 and 20:80. The content of unconjugated diene is preferably comprised between 4 and 50, in terms of the iodine number. The unconjugated diene can be a norbornene; a cyclic diene such as di-cyclo-pentadiene and cyclo-octadiene-1,5, or an aliphatic diene such as pentadiene 1,4, hexadiene-1,4 hexadiene-1,5, etc.

The preferred EPDM rubbers are the terpolymers consisting of ethylene/propylene/5-methyl-tetrahydroindene, ethylene/propylene/6-ethylidene-2-norbornene, ethylene/propylene/6-methylen-2-norbornene, ethylene/propylene/5-ethyliden-2-norbornene, etc.

The elastomers at high insaturation can be polybutadiene, polysoprene, copolymers of butadiene and/or isoprene with styrene or with other monomers, polychloroprene etc.

The amount of elastomer is such as to have a percentage of rubber comprised between 10 and 70% by weight, preferably between 15 and 40%, in the final copolymer.

Any ethylenically unsaturated monomer containing a carboxylic group or its derivatives in the molecule, can be used for the production of the high impact vinyl-aromatic graft copolymers, specific examples of such monomers are the following: maleic acid, fumaric acid, maleic anhydride, maleic amide, unsaturated carboxylic acids such as acrylic acid, crotonic acid, vinyl-acetic acid, pentenoic acid, 2 or 3 pentenoic acid, alpha ethyl-acrylic acid, beta-methyl-crotonic acid, 2-methyl-2-pentanoic acid, alpha-ethyl-crotonic acid, 2,2-dimethyl-3-butenoic acid, heptenoic acid, 2-octenoic acid, 9-tetradecenoic acid, 9-hexadecenoic acid, 2-octadecenoic acid, 9-octadecenoic acid decosenoic acid, erucic acid, 2,4-pentadienoic acid, diallylacetic acid, linoleic acid, linolenic acid, etc. and esters, amides and anhydrides of the above unsaturated acids.

The preferred ethylenically unsaturated monomers are maleic anhydride, maleic imides and fumaric acid, particularly the first one because of its high reactivity.

It is understood that in the graft-polymerization not all the unsaturated monomers are grafted on the rubber substrate; some of them may give place to free copolymers which are present in a physical mixture with the graft-copolymer.

The amount of monomers grafted on the rubber substrate can be determined by the extraction of the copolymer using a solvent of the ungrafted resin.

The polyamide resins (component B), useful to the aim of the present invention, are the conventional ones, injection moldable, generally known as nylon resins including the aliphatic polylactams obtained by opening the lactams ring and the polyamides produced by polycondensation of an aliphatic diamine, containing from 4 to 14 carbon atoms, with an aliphatic bicarboxylic acid containing from 4 to 12 carbon atoms. Examples of suitable polyamide resins include: nylon 4, nylon 6; nylon 7; nylon 11; nylon 12; nylon 6,6; nylon 6,9; nylon 6,10; nylon 6,12 etc.

Partially aromatic nylons can also be used as component B in the compositions of the present invention.

The term "partially aromatic nylons" means those obtained by partially or completely substitution of an aliphatic residue of an aliphatic nylon by an aromatic residue.

For example, the residues of adipic acid in nylon 6,6 can be substituted by terephtalic or isoftalic acid residues or by mixtures thereof; similarly some aminic residues can have aromatic nature.

Preferred polyamide resins are nylon 6, nylon 6,6 or random copolymers nylon 6 and nylon 6,6.

The average molecular weight of the polyamide resins is advantageously above 10.000 and preferably above 15.000 and the melting point is preferably above 200° C.

The compositions of the present invention can be prepared by hot mixing in any known mixing unit endowed with medium or high mixing power, such as single or double screw extruders, Banbury mixer, mixing rollers etc. at a temperature between 220° and 260° C.

The compositions of the present invention can contain stabilizing agents, UV stabilizers or other additives intimately incorporated, such as plasticizers, lubricants, flame retardant agents, flow agents, antistatics, dyes, pigments, glass fibres or other inorganic fillers etc. in order to impart particular characteristics to the material.

The compositions of the present invention, are easily processable and show a lot of properties that make them suitable to be used for the preparation of articles having both a high impact and a thermal resistance and a reduced water sensibility.

These compositions find application in the motor transport fields, for the production of pieces that can be painted in oven, parts that come into contact with the motor, electric house-hold appliances, electronic and general technical articles having different forms such as cups, boxes, containers, panels, sheets, rods, etc.

The compositions can be used to produce foamed articles, using the known techniques.

DESCRIPTION OF THE PREFERRED EMBODIMENTS

To enable a clearer interpretation and to allow the practical embodiment of the present invention, the following examples are listed as an illustration of said invention but without limiting it in any way.

In the examples all parts and percentages are expressed by weight, unless otherwise indicated.

EXAMPLES 1-6

By means of double screw extruder Baker-Perkins MPC V30, there were extruded, with degasing and at the temperature of 240°-250° C., compositions consisting of:

A) styrenic high impact, graft copolymer, consisting of 35% by weight of EPDM rubber with 62-72 ML-4 Mooney viscosity at 100° C. and iodine number 18, and 65% by weight of a styrene/acrylonitrile (SAN) copolymer in the weight ratio 70/30, containing grafted maleic anhydride in an amount as reported in the following table. This copolymer was prepared according to the process described in example 2 of the co-pending Italian patent application No. 20 306 A/90 filed on May 15, 1990 in the name of the same Applicant;

B) Nylon 6 produced by Montedipe with trade mark "TERNIL B 27", having average molecular weight of 18.000.

The ratios by weight between the components of the composition reported in table I.

By cutting the strands coming out of the extruder, granules were obtained that were dried for 2-4 hours at 80°-90° C.

To evaluate the mechanical and thermal properties, the granules were injection molded at the temperature of 220°-240° on Negri & Bossi V17 press to obtain test pieces having the dimensions required by the ASTM standards.

The measured characteristics and the used methods are the following ones:

Mechanical Properties

The elongation at break in tensile tests, ultimate tensile stress, yield strength and the elastic modulus were determined according to ASTM D638, and the IZOD notched impact strength at 23° C. according to ASTM D2656, on test pieces having a thicknesses of 3,2 mm. and 12.7 mm.

Thermal properties

The VICAT A softening temperature (1 KG in oil) were determined according to ISO 306.

The measured properties are reported in the following table I:

TABLE I

| | | EXAMPLES | | | | | |
|---|---|---|---|---|---|---|---|
| | | 1* | 2 | 3 | 4 | 5 | 6 |
| COMPOSITIONS | | | | | | | |
| A) High impact styrenic graft copolymer | | 50 | 50 | 50 | 50 | 50 | 50 |
| amount of maleic anhydride % by weight | | 0 | 0.15 | 0.20 | 0.40 | 0.50 | 1 |
| B) Nylon 6 | | 50 | 50 | 50 | 50 | 50 | 50 |
| PROPERTIES | UNITS | | | | | | |
| IZOD a 3,2 mm | J/m | 70 | 220 | 930 | 970 | 1000 | 1050 |
| IZOD a 12,7 mm | J/m | 60 | 200 | 300 | 400 | 700 | 710 |
| Elastic modulus | N/mm$^2$ | 1500 | 1600 | 1700 | 1980 | 1960 | 1500 |
| Ultimate tensile stress | N/mm$^2$ | 36 | 36 | 40 | 40 | 40 | 40 |
| Yield strength | N/mm$^2$ | 35 | 37 | 37 | 40 | 40 | 36 |
| Elongation | % | 10 | 75 | 125 | 152 | 155 | 170 |
| VICAT A | °C. | 192 | 191 | 192 | 193 | 191 | 191 |

*Comparative example

What is claimed is:

1. A thermoplastic composition, having improved mechanical properties, comprising:
   (A) from 10 to 90% by weight of an impact-resistant graft copolymer consisting of
      (a) a vinyl aromatic monomer
      (b) an ethylenically unsaturated nitrile monomer of the formula $CH_2=CR-CN$, wherein R is hydrogen or $C_{1-5}$ alkyl, the weight ratio of (a):(b) being from 90:10 to 50:50, and
      (c) an ethylenically unsaturated monomer in an amount of 0.1 to 1.0% by weight, based on (A), containing a carboxylic acid group or an anhydride, amide or an ester thereof in the molecule,
   said monomers being at least partially grafted on 10 to 40% by weight, based on the total weight of (A), of an ethylene-propylene-unconjugated diene rubber; and
   (B) from 90–10% by weight of a polyamide resin.

2. The thermoplastic composition according to claim 1, wherein the weight ratio of impact-resistant graft copolymer/polyamide resin (A/B) is from 70:30 to 30:70.

3. The thermoplastic composition according to claim 1, wherein said weight ratio is from 80:20 to 60:40.

4. The thermoplastic composition according to claim 1, wherein the amount of the ethylenically unsaturated monomer (c) having in the molecule a carboxylic acid group or an amide, ester or anhydride thereof, is from 0.3 to 0.5% by weight.

5. The thermoplastic composition according to claim 1, wherein the vinyl aromatic monomer (a) has the formula:

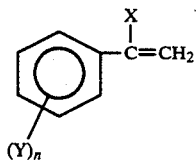

wherein:
X is a hydrogen atom or an alkyl radical having from 1 to 4 carbon atoms;
Y is a hydrogen atom, a halogen atom or an alkyl radical having from 1 to 4 carbon atoms; and
n is 0 or an integer of 1 to 5.

6. The thermoplastic composition according to claim 1, wherein the ethylenically unsaturated nitrile monomer (b) is acrylonitrile.

7. The thermoplastic composition according to claim 1, wherein the ethylenically unsaturated monomer (c) is selected from the group consisting of maleic acid, fumaric acid, acrylic acid, crotonic acid, vinylacetic acid, pentenoic acid, 2-pentenoic acid, 3-pentenoic acid, α-ethyl acrylic acid, β-methyl crotonic acid, 2-methyl-2-pentenoic acid, α-ethyl crotonic acid, 2,2-dimethyl-3-butenoic acid, heptenoic acid, 2-octanoic acid, 9-tetradecenoic acid, 9-hexadecenoic acid, 2-octadecenoic acid, 9-octadecenoic acid, dococenoic acid, erucic acid, 2,4-pentadienoic acid, diallyl acetic acid, linoleic acid, linolenic acid, and esters, amides and anhydrides of the above acids.

8. The thermoplastic composition according to claim 7, wherein the ethylenically unsaturated monomer (c) is maleic anhydride.

9. The thermoplastic composition according to claim 1, wherein the polyamide resin is nylon 6.

10. The thermoplastic composition according to claim 1, which further comprises stabilizing agents, plasticizers, lubricants, flame retardant agents, anti-statics, dyes, pigments, glass fibers or other inorganic fibers.

11. The thermoplastic composition according to claim 1, wherein said improved mechanical properties comprise improved impact resistance.

* * * * *